Sept. 15, 1925.                                              1,553,502
J. G. BOYES
COMBINED STOCK FEEDER AND WATER TROUGH
Filed Dec. 15, 1922
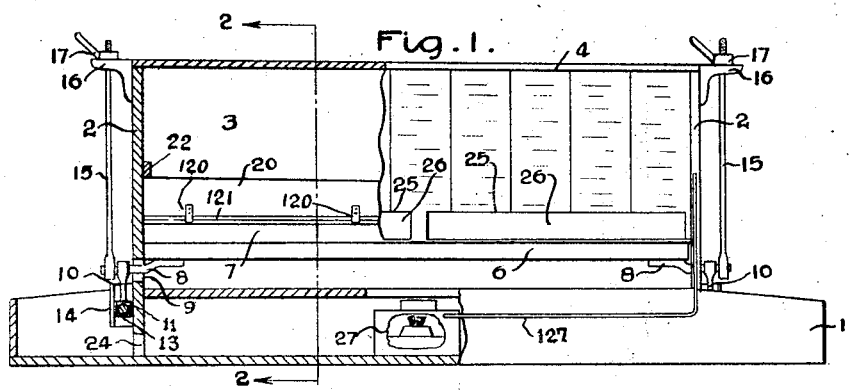
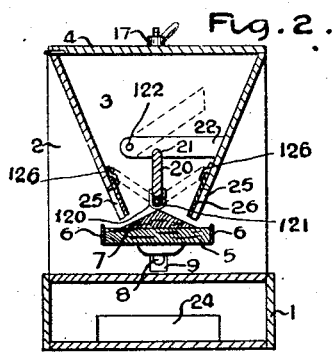
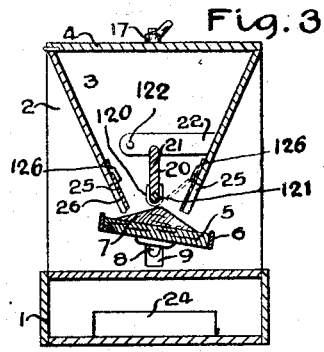
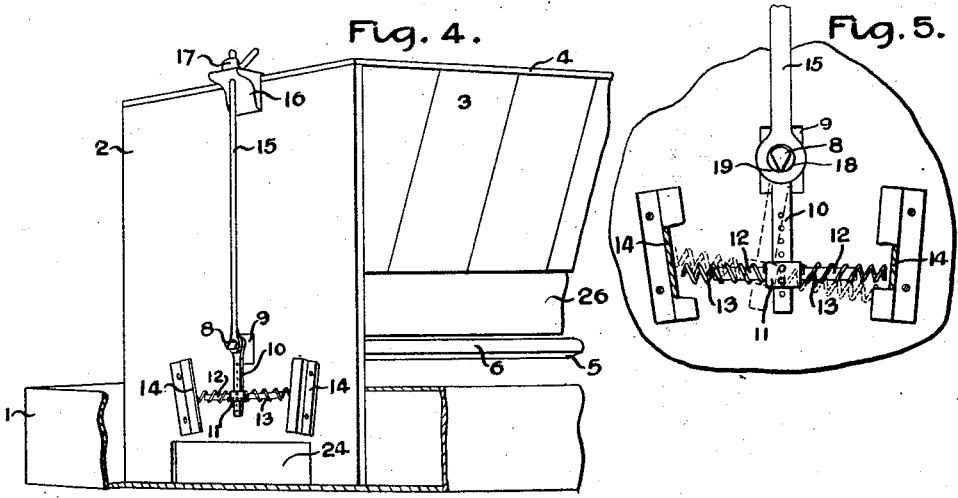
INVENTOR
JOHN. G. BOYES,
BY. Fetherstonhaugh & Co.
ATTYS.

Patented Sept. 15, 1925.

1,553,502

UNITED STATES PATENT OFFICE.

JOHN GEORGE BOYES, OF CREEMORE, ONTARIO, CANADA.

COMBINED STOCK FEEDER AND WATER TROUGH.

Application filed December 15, 1922. Serial No. 607,163.

*To all whom it may concern:*

Be it known that I, JOHN GEORGE BOYES, a subject of the King of Great Britain, and a resident of the village of Creemore, in the county of Simcoe, in the Province of Ontario, Canada, have invented certain new and useful Improvements in Combined Stock Feeders and Water Troughs, of which the following is the specification.

My invention relates to improvements in combined stock feeders and water troughs and the object of the invention is to devise means for automatically distributing more food onto a platform capable of being rocked as the food is eaten by the stock therefrom.

A further object is to devise means whereby the rocking of the platform controls the distribution of the food thereonto, such platform being rocked by the stock.

A still further object is to devise means for providing a water trough below the platform. Another object is to devise means for manually operating the platform so as to shut off or regulate the supply of food thereonto and yet another object is to devise means for heating the water in the water trough in the winter time.

My invention consists of a combined stock feeder and water trough constructed and arranged all as hereinafter more particularly described and illustrated in the accompanying drawing in which:

Fig. 1 represents a side elevation of my device partly in section.

Fig. 2 is a vertical cross section through the line 2—2 Figure 1.

Fig. 3 is a similar view to Figure 2 showing the platform rocked in one direction.

Fig. 4 is a perspective view of one end of my device showing the means for manually operating the platform, and Fig. 5 is an enlarged elevational detail view of a portion of one end of my device showing the platform operating means.

Like characters of reference indicate corresponding parts in the different views.

1 is the water trough in which are suitably positioned the upwardly extending end members 2 of the food containing hopper 3 provided with the removable lid 4, said hopper being raised considerably from the water trough 1 to permit the feed platform 5 to be inserted therebetween. The platform 5 is provided with upwardly extending side flanges 6 to prevent the food falling off the same. 7 is an opposedly inclined member on the upper surface of the platform for guiding the food down towards the flanges 6. Such platform 5 is positioned immediately under the open bottom of the hopper 3 and has mounted on its ends the longitudinally extending spindles 8 which extend freely through slots 9 in the end members 2.

The ends of the spindles 8 extend exteriorally of the end members 2 and are provided with the depending levers 10 on which the vertically adjustable block 11 is mounted, said block being provided with opposedly laterally extending pins 12 upon which are mounted the spiral springs 13 which are adapted to bear alternately against the opposed stops 14 secured to the end members 2, upon the platform 5 being rocked in one direction or the other.

15 are depending hanger rods vertically adjustable in the brackets 16 said rods being secured to the end members 2 by means of the lever nuts 17 threaded onto the upper ends of such hanger rods. The lower ends of the hanger rods have circular orifices 18 extending therethrough adapted to receive the knife edge ends 19 of the spindles 8. 20 is a flap supported centrally of the hopper 3 in the vicinity of its lower edge by means of the hinges 120 which consist of straps extending freely about the longitudinal rod 121 and normally retained in place by having its upper edge inserted into the notch 21 in the catch 22 which is pivoted on the pin 122. The flap 20 is normally retained in the inoperative position by means of the catch 22 and when it is desired to move it into the operative position the catch 22 is raised by hand and the flap allowed to swing down against the side of the hopper 3 as is illustrated in dotted lines in Figure 2.

24 are slots in the lower ends of the end members 2 for permitting the water to distribute itself throughout the trough.

The lower portions of the sides of the hopper 3 are provided with cut-away portions 25 adapted to be normally covered by the flaps 26 which are hinged by hinges 126 to the sides of the hopper 3 and capable of being swung inwardly. 27 is a totally enclosed lamp provided in the trough 1 for preventing the water therein freezing in the winter-time. 127 is an air pipe leading from the lamp casing 27 to a convenient position.

My device is operated as follows:

In the normal position the feed platform 5 is in the position illustrated in Figure 2. Upon a hog or other animal, eating the food off such platform it is rocked into the position illustrated in Figure 3 and when he has eaten the food on that side of the platform, further food from the hopper 3 is permitted to fall onto the platform. Frequently he will press back one of the flaps 26 and thus agitate the food in the mouth of the hopper and prevent it clogging therein. When the platform is rocked into the position illustrated in Figure 3 the lever 10 is swung into the position illustrated in dotted lines in Figure 5 wherein the corresponding springs 13 at each end are compressed against their corresponding stops 14 and when the hog withdraws his snout from the platform such platform will be restored to its normal position under the influence of such springs.

The device will operate in identical manner if the hog feeds from the other side, but if it is desired that the hog should only feed from one side, the flap 20 can be swung down as is illustrated in dotted lines in Figure 2, thus only permitting the food to go down one side of the opposedly inclined portion onto the platform.

By adjusting the height of the hanger rods 15 by the lever nuts 17 it will be seen that the platform can be raised or lowered as desired to regulate the quantity of food distributed onto the platform from the hopper, or by screwing the hanger rods 15 up to their full extent the supply of food can be cut off altogether.

By adjusting the blocks 11 on the levers 10, the degree of rocking of the platform can be regulated so as to permit more or less food to be distributed on the platform independently of the adjustment of the hanger rods 15 which are more particularly adapted to adjust the device for the size of corn or other food used when the blocks 11 are at the bottom of the levers 10 the ends of the springs 13 are much closer to the stops 14 than when the blocks are at the top of the levers. Consequently the corresponding swing of the platform is much less.

From the above description it will be seen that I have devised a simple and effective device which will automatically keep a supply of food on the platform and by which the supply can be readily adjusted to suit different requirements.

What I claim as my invention is:

1. A stock feeder comprising a food containing hopper having an open bottom, depending end members supporting the hopper, a normally horizontally disposed food receiving platform positioned below the open bottom of the hopper, outwardly extending longitudinally positioned spindles secured to said platform, depending hanger rods adjustably secured to the end members and having holes in their lower ends to receive the ends of the spindles and coacting adjustable means between the spindles and the end members for limiting the rocking of the platform and restoring it to its normal horizontal position when rocked.

2. A stock feeder comprising a food containing hopper having an open bottom, depending end members supporting the hopper, a normally horizontally disposed food receiving hopper positioned below the open bottom of the hopper outwardly extending longitudinally positioned spindles secured to said platform, depending hanger rods adjustably secured to the end members and having holes in their lower ends to receive the ends of the spindles, depending levers secured to the spindles, blocks with opposed laterally extending pins adjustably mounted on the levers, springs on the pins, and opposed stops engaged by the springs upon the platform being rocked.

3. A stock feeder comprising a food containing hopper having an open bottom, depending end members supporting the hopper, a normally horizontally disposed food receiving platform positioned below the open bottom of the hopper, outwardly extending longitudinally positioned spindles secured to said platform, depending hanger rods adjustably secured to the end members and having holes in their lower ends to receive the ends of the spindles, coacting adjustable means between the spindles and the end members for limiting the rocking of the platform and restoring it to its normal horizontal position when rocked, and means coacting with the spindles for adjustably supporting the platform whereby the distance between the lower edges of the hopper and the platform can be varied.

4. A stock feeder comprising a food containing hopper having an open bottom, depending end members supporting the hopper, a normally horizontally disposed food receiving platform positioned below the open bottom of the hopper, outwardly extending longitudinally positioned spindles secured to said platform, depending hanger rods adjustably secured to the end members and having holes in their lower ends to receive the ends of the spindles, coacting adjustable means between the spindles and the end members for limiting the rocking of the platform and restoring it to its normal horizontal position when rocked, vertical rods having orificed lower ends into which the spindles are inserted, and means for adjustably securing the upper ends of the rods to the hopper.

JOHN GEORGE BOYES.